March 2, 1937.  C. L. EKSERGIAN  2,072,800
WIRE SPOKE WHEEL
Filed May 27, 1932
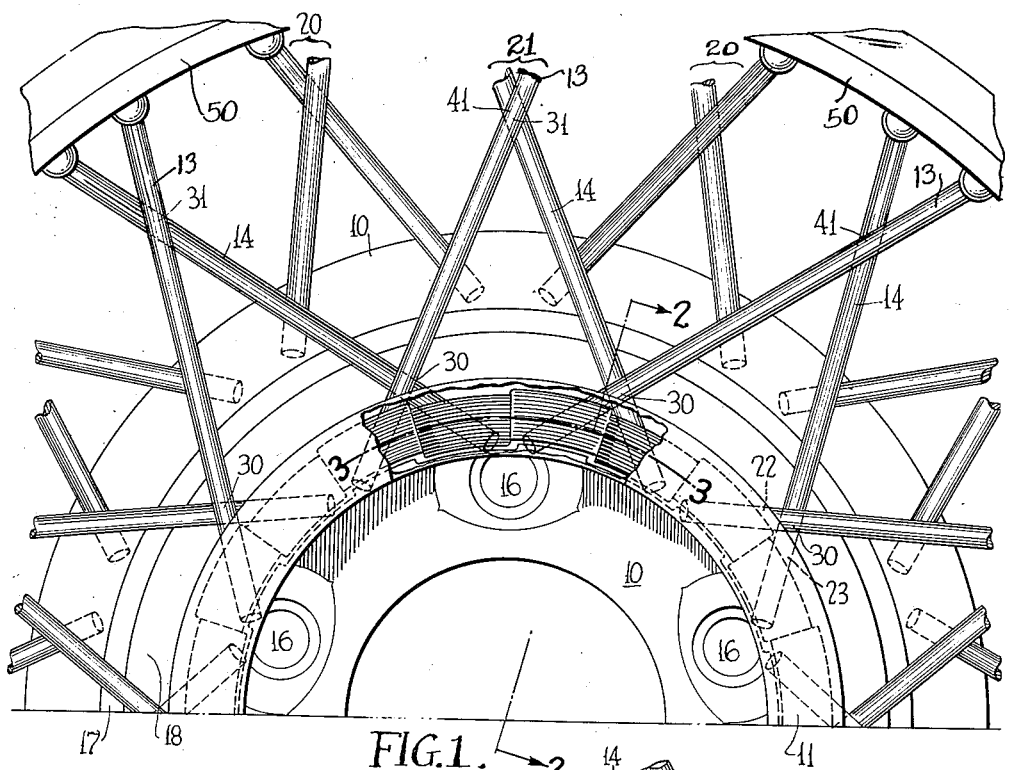
FIG.1.
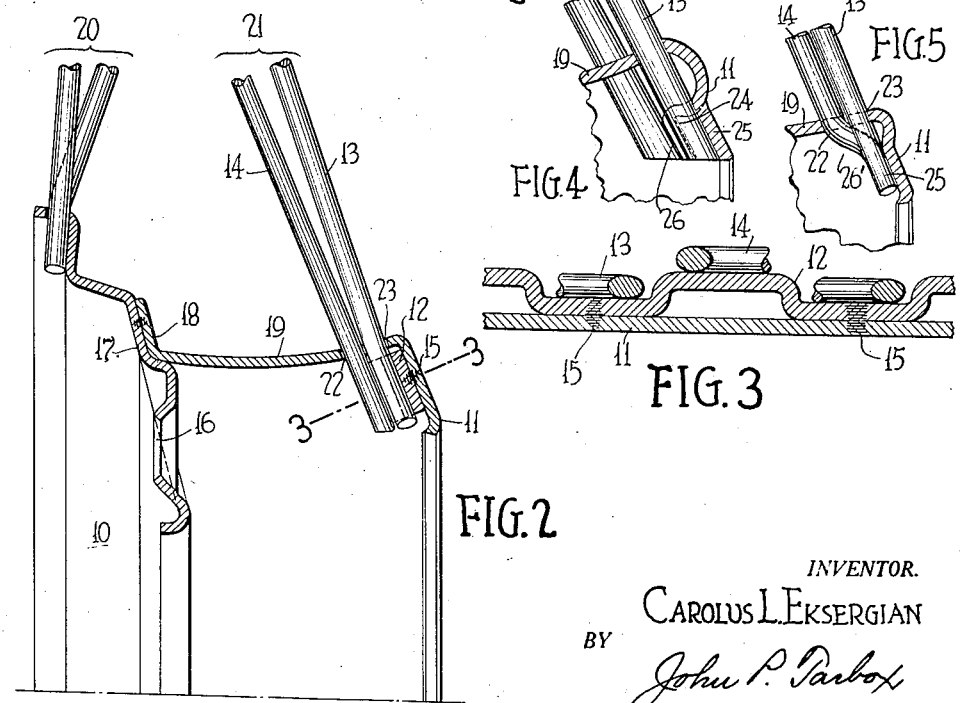
INVENTOR.
CAROLUS L. EKSERGIAN
BY John P. Barbox
ATTORNEY.

Patented Mar. 2, 1937

2,072,800

UNITED STATES PATENT OFFICE 2,072,800

WIRE SPOKE WHEEL

Carolus L. Eksergian, Detroit, Mich., assignor to Budd Wheel Company, Philadelphia, Pa., a corporation of Pennsylvania Application May 27, 1932, Serial No. 613,911

11 Claims. (Cl. 301—59)

My invention relates to vehicle wheels and more particularly to those of the wire spoke type and has for an object the making of a wheel wherein the spokes of one group double-cross the spokes of another group and are thereby more readily secured to the rim and hub members.

Another feature of my invention is a spoke series arranged in staggered relation whereby the previously mentioned advantages are obtained.

I attain the above desired objects and others incidental thereto by making a wheel having a hub, a rim, and an inter-connecting series of spokes secured in axially offset relation centrally of the wheel.

My invention will be better understood from the following description when considered in connection with the accompanying drawing and its scope will be pointed out in the appended claims.

In the accompanying drawing wherein like ordinals represent corresponding parts in the various figures, Fig. 1 is a partial elevation of the upper half of a wheel, parts being broken away, Fig. 2 is a partial cross-section on the line 2—2 of Fig. 1, Fig. 3 is a cross-section on the line 3—3 of Figs. 1 and 2, and Figs. 4 and 5 are cross sections of modifications corresponding to sections taken on the line 3—3 of Fig. 1.

Reference being had to the accompanying drawing wherein I have illustrated in the various figures a wheel constructed in accordance with my invention, 10 indicates the inner section of a mounting disc carrying a plurality of openings 16 for purposes of fastening the wheel to a hub flange. The mounting plate 10 is formed with a radially extending conical section 17 to receive in pressed fit a correspondingly formed conical section 18 of the hub shell 19, any suitable system of fastening being used such as riveting or welding. The composite hub structure made up of the mounting disc 10 and hub shell 19 form an internal section of the wheel having a double conical structure of great strength. The customary outer rim is supported by a plurality of spokes formed in two axially spaced series 20 and 21.

The spokes of each series are divided into two groups, the individual spokes extending in opposite directions relatively to radial lines interconnecting the hub 19 and a rim or felly member 50. The spokes 20 of the inner axial series cross intermediate the hub and rim.

The spokes of the outer axial series are likewise divided into two groups, the groups of spokes each extending angularly radially in opposite directions relatively to radial lines interconnecting the hub and rim. The spokes of this series are arranged in a crossed bracing fashion in such manner that the individual spokes of each group of the series cross a plurality of spokes of the other group of the same series, as at points 30, 31 for one group and 30, 41 for the other group.

A substantially ring shaped member 12 of scalloped formation is fastened to the inner conical surface 11 of the hub shell 19 by suitable spud or other form of welding as at 15. The telescoping construction thus formed gives the hub shell at this point a double reinforcement which is extremely desirable for resisting axial and radial loads. I am enabled to fasten the spokes along their normal line of contact by edge welds giving large substantially rectangular areas to carry any shear or other loading of the wheel. This is most desirable as a small welded area is more subject to fracture by impactual loads.

The consecutive spokes 13 and 14 of each of the groups of the outer axial series 21 pass through the hub shell by means of a double series of perforations 22 and 23 and are edge welded respectively to the crests and troughs of the ring 12. The securement of the spokes by means of this construction allows double crossing thereof between the rim and hub due to the axial offset arrangement centrally of the wheel.

Several features of importance are herein found in that the wheel bolting on circle is within the hub shell or barrel so that it is protected from external elements. The spokes are edge welded along the normal connection between the parts, thereby eliminating any unnecessary strains in the joints, as regards bending, since shear loads only are upon the welds. The welds also being within the hub shell corrosion is not likely to occur, whereas any possible unsightly appearance of the welds is not visible from the outside of the wheel.

In the above-described structure, the inner ends of the spokes of series 20 are secured to an adjacent side of the mounting disc 10.

The embodiment of the invention herein illustrated and described has been selected for the purpose of clearly setting forth the principles involved. It will be apparent, however, that the invention is susceptible of being modified and several such forms are shown. For example, in Fig. 4 an axially offset arrangement of the hub shell itself is used thereby eliminating an additional member or part. In this manner the inwardly extending flange 11 of the hub barrel 19 is corrugated or indented at spaced points as at 24. The axially outer spokes 13 are edge welded along the line of contact 25 between the hub shell and each spoke; the spokes 14 of the inner group are edge welded to the inner hub shell portions 24 as at 26.

To obtain the offset arrangement without corrugating the hub shell the spokes themselves may serve to furnish the offset arrangement as in Fig. 5. The two spoke groups 13 and 14 of the outer series pass through axially spaced holes 22, 23 in the hub shell and are edge welded to the flange 11. One group as 14 is formed as at 26' so that in this case a line of welds in a single plane is obtained. It is therefore seen that in Figures 1, 2 and 3 an offset securement is obtained by having offset seats or portions upon the ring 12 to which the seats on the spokes are welded. In Figure 4, this same benefit is obtained by providing offset seats or portions upon a substantially radially extending portion 11 of the hub shell 19, the spokes having their seat portions welded to the offset seats or portions of the hub shell. In Figure 5, the securement of these spoke ends to the hub member seating areas is attained through the offsetting of the spoke ends, the ends being edge welded to the hub part 11. It is therefore seen that in the various forms, portions are provided upon the spokes and upon a means interiorly of the hub member. This means may constitute a ring 12, or a corrugated portion 24, of the hub member itself as in Figure 4 or an offset arrangement of the inner ends or portions of the spokes as shown in Figure 5. Thus the securement is by welding through the inner offset seats or portions be these portions the spokes, the hub or a separate member secured to the hub.

What I claim is:

1. A vehicle wheel including in combination a hub shell, a rim member, a plurality of spokes interconnecting said hub shell and rim member and arranged in two series spaced axially apart at the hub shell, the spokes of one series comprising two groups each of which is of opposite angularity relative to wheel radii, said spokes crossing intermediate the hub and rim, and a ring of scalloped formation interiorly of and secured to said hub shell, the spokes of one group of said series being secured to the crests of said ring and the spokes of the other group of said series being secured to the troughs of said ring whereby to facilitate the crossing of said spokes of opposite angularity.

2. A vehicle wheel including in combination a hub shell, a rim member, a plurality of spokes interconnecting said hub shell and rim member and arranged in two series spaced axially apart at the hub shell, the spokes of one series comprising two groups of opposite angularity relative to wheel radii, said spokes crossing intermediate the hub and rim, and a ring of scalloped formation interiorly of and secured to said hub shell, the spokes of one of said groups being edge-welded to the crests of said ring and the spokes of the other of said groups being edge-welded to the troughs of said ring whereby to facilitate the crossing of said spokes of opposite angularity.

3. A vehicle wheel including in combination a hub shell, a rim member, a plurality of spokes interconnecting said parts and arranged in two series spaced axially apart at the hub shell, the spokes of one series comprising two groups of opposite angularity relative to wheel radii, said last mentioned spokes crossing intermediate the hub and rim, and a ring secured interiorly of said hub shell, having peripherally spaced axially offset portions the spokes of said groups alternately secured to said offset portions.

4. A vehicle wheel including in combination a hub shell having a radially inwardly extending flange, a rim member, a plurality of spokes interconnecting said parts and arranged in two series spaced axially apart at the hub shell, the spokes of one series comprising two groups of opposite angularity relative to wheel radii, said last mentioned spokes crossing intermediate the hub and rim, and a ring bearing peripherally spaced axially offset portions secured to said inwardly extending flange of said hub shell and interiorly thereof, the spokes of said groups secured to said respective offset portions.

5. A vehicle wheel including, in combination, a hub shell, a rim member, a plurality of spokes interconnecting said aforementioned parts and being arranged in two series spaced axially apart at the hub shell, the spokes of the inner axial series consisting of two groups extending in opposite angular directions relative to radial lines interconnecting the hub and rim members, individual spokes of one of said groups crossing individual spokes of the other of said groups intermediate the hub and rim, the spokes of the outer axial series consisting of two groups extending in opposite angular directions relative to radial lines interconnecting the hub and rim members, individual spokes of each of said last mentioned groups crossing a plurality of spokes of the said groups intermediate the hub and rim, and a ring of scalloped formation secured interiorly of the hub shell, the consecutive spokes of each group of the outer axial series passing through said hub shell and edge welded respectively to the crests and troughs of said ring, to facilitate the double crossing of said spokes of opposite angularity.

6. A wheel comprising a felly, a hub element, an interconnecting body of double crossed spokes, one crossing being substantially adjacent the hub element, and an annular inner spoke end securement member interiorly of said hub element having a plurality of circumferentially spaced radially extending portions constituting seats to which the inner ends of the spokes are secured, said portions being axially offset with respect to each other.

7. A wheel comprising a felly, a hub shell, and a plural series of spokes of opposite angularity interconnecting said aforementioned parts and crossing each other adjacent the hub shell, said hub shell having a radially inwardly extending flange bearing spaced apart axially offset substantially radially extending portions, and consecutive spokes of similar angularity of said series passing through said hub shell and secured interiorly thereof to alternate of said offset hub portions.

8. A wheel comprising a rim, a hub shell having a radially inwardly extending flange, and two series of double crossed spokes interconnecting said rim and hub shell, alternate adjacent areas of the same side of said flange being axially offset from each other interiorly of said hub shell, ends of the spokes of one of said series being secured alternately to said adjacent areas.

9. A wheel comprising a felly, a hub, double crossed spokes connecting the hub to the felly, one crossing of the spokes being adjacent to the hub, and an annular securing member for the inner ends of the spokes interiorly of the hub having adjacent radially extending portions of its main body alternately axially bodily offset from each other constituting seats for said spoke ends, said spokes and said hub being connected by welds through said offset portions.

10. A wheel comprising a felly, a hub member, an interconnecting body of double crossed spoke members one crossing being substantially adjacent the hub member, and an inner spoke end securing member having radially extending axially offset, axially inwardly-facing portions constituting alternate seats for said spoke ends, said spoke members and hub member being secured to said securing member and said seats by electric welding.

11. A wheel comprising a rim, a hub member, spokes interconnecting said rim and hub member crossing each other and having inner end securing portions and securing means for the inner spoke ends interiorly of said hub member affording radial securing seating areas for said crossed spokes, alternate annularly spaced adjacent, axially inwardly-facing seating areas of said securing portions being axially offset, said inner ends of the spokes being welded to said seating areas.

CAROLUS L. EKSERGIAN.